US012357952B2

(12) United States Patent
Kornacki

(10) Patent No.: US 12,357,952 B2
(45) Date of Patent: Jul. 15, 2025

(54) ASSEMBLY FOR SELECTIVELY AERATING AND CHANGING THE TEMPERATURE OF A BEVERAGE

(71) Applicant: Üllo LLC, Chicago, IL (US)

(72) Inventor: James Richard Kornacki, Chicago, IL (US)

(73) Assignee: Üllo LLC, Chicago, IL (US)

( * ) Notice: Subject to any disclaimer, the term of this patent is extended or adjusted under 35 U.S.C. 154(b) by 890 days.

(21) Appl. No.: 17/544,604

(22) Filed: Dec. 7, 2021

(65) Prior Publication Data

US 2022/0176328 A1 Jun. 9, 2022

Related U.S. Application Data

(60) Provisional application No. 63/122,304, filed on Dec. 7, 2020.

(51) Int. Cl.
*B01F 23/2361* (2022.01)
*A47G 19/22* (2006.01)
(Continued)

(52) U.S. Cl.
CPC ...... *B01F 23/2361* (2022.01); *A47G 19/2288* (2013.01); *B01F 23/23761* (2022.01); *B01F 23/802* (2022.01); *B01F 2101/17* (2022.01)

(58) Field of Classification Search
CPC ..... A23L 2/78; A23L 2/80; A23L 2/56; A23L 2/70; A23L 33/105; A23L 5/27; A23L 2/72; C12H 1/0416; C12H 1/003; C12H 1/02; C12H 1/0424; C12H 1/0432; C12H 3/04; C12G 1/04; C12G 2200/15; C12G 3/06;
(Continued)

(56) References Cited

U.S. PATENT DOCUMENTS 4,163,374 A * 8/1979 Moore .................. F25D 31/007 220/592.01
6,450,214 B1 9/2002 Dyer et al.
(Continued)

FOREIGN PATENT DOCUMENTS

EP 2732868 A2 5/2014
WO WO-2007/096676 A1 8/2007
(Continued)

*Primary Examiner* — Vy T Nguyen
(74) *Attorney, Agent, or Firm* — MARSHALL, GERSTEIN & BORUN LLP

(57) ABSTRACT

An assembly for selectively aerating and heating or cooling a beverage. The assembly includes a body that receives the beverage, a heat transfer element having a control temperature, a diverter in communication with and coupled to the body, and an aerator in communication with the diverter, the aerator including a plurality of flow features and an outlet. The heat transfer element carried by the body, such that the heat transfer element is arranged to change a temperature of the beverage in the body using the control temperature. When the diverter is in a first position, the flow features are accessible and the beverage flows through the body portion, along the plurality of flow features, and through the outlet. When the diverter member is in a second position, the flow features are not accessible and the beverage flows through the body portion and through the outlet while bypassing the flow features.

20 Claims, 22 Drawing Sheets

(51) Int. Cl.

*B01F 23/237* (2022.01)
*B01F 23/80* (2022.01)
*B01F 101/17* (2022.01)

(58) Field of Classification Search

CPC ......... A23B 70/10; A23B 7/154; A23B 2/762; A23B 2/767; A23B 2/729; A23B 2/733; A23B 2/75; A23B 2/754; A23B 7/10; A23V 2002/00; A23V 2200/048; A23V 2250/0644; A23F 3/163; C12Y 208/01002; C22B 3/24

USPC ....... 426/532, 592, 271, 442, 490, 495, 269, 426/654; 99/495; 210/151, 198.1, 200

See application file for complete search history.

(56) References Cited

U.S. PATENT DOCUMENTS

| | | | |
|---|---|---|---|
| 7,841,584 | B2 | 11/2010 | Sabadicci et al. |
| 8,196,906 | B2 | 6/2012 | Benton et al. |
| 8,272,538 | B2 | 9/2012 | Weinberg et al. |
| 8,430,023 | B2 | 4/2013 | Hynes |
| 8,590,865 | B2 | 11/2013 | Heyman et al. |
| 8,727,324 | B2 | 5/2014 | Borden et al. |
| 9,719,061 | B2 * | 8/2017 | Buzzard ............ B01F 23/23411 |
| 2010/0025867 | A1 | 2/2010 | Benton et al. |
| 2011/0024461 | A1 | 2/2011 | Kilduff et al. |
| 2011/0024925 | A1 | 2/2011 | Mauffette |
| 2011/0271846 | A1 | 11/2011 | Hynes |
| 2012/0111893 | A1 | 5/2012 | Luebke |
| 2012/0156338 | A1 | 6/2012 | Agarwal et al. |
| 2012/0156345 | A1 | 6/2012 | Agarwal et al. |
| 2013/0140721 | A1 | 6/2013 | Borden et al. |
| 2013/0280374 | A1 | 10/2013 | Catelli et al. |
| 2014/0120226 | A1 | 5/2014 | Kuru et al. |
| 2015/0093485 | A1 | 4/2015 | Kornacki |
| 2016/0131421 | A1 * | 5/2016 | Bogaard ................... F25D 3/08 62/457.4 |

FOREIGN PATENT DOCUMENTS

| | | | |
|---|---|---|---|
| WO | WO-2009/122234 | A2 | 10/2009 |
| WO | WO-2013/022696 | A2 | 2/2013 |

* cited by examiner

ASSEMBLY FOR SELECTIVELY AERATING AND CHANGING THE TEMPERATURE OF A BEVERAGE

CROSS-REFERENCE TO RELATED APPLICATION

The present patent application claims the priority benefit of U.S. Provisional Patent Application No. 63/122,304, entitled "Assembly for Selectively Aerating and Changing the Temperature of a Beverage" and filed Dec. 7, 2020, the entire disclosure of which is hereby incorporated by reference herein.

FIELD OF THE DISCLOSURE

This disclosure relates generally to an assembly for selectively aerating and changing the temperature of a beverage such as wine.

BACKGROUND

Often, wine is enhanced with entrained air through an aeration device, such as those disclosed in U.S. Pat. Pub. No. US 2012/0156338 A1 and U.S. Pat. No. 7,841,584 B2, which are hereby incorporated by reference. Aerators are used to soften tannins and improve taste but are not capable of eliminating undesirable wine additives, such as preservative sulfites.

Oenophiles generally agree that different wines require different preparative approaches to attain the peak possible experience. Not all wines are enhanced by aerating the wine because too much exposure to oxygen can adversely alter the flavor of the wine. Similarly, some wines are enhanced by being served chilled, while others present a peak experience when served around room temperature.

SUMMARY OF THE DISCLOSURE

In accordance with a first aspect, an assembly for selectively aerating and heating or cooling a beverage having a first temperature is disclosed. The assembly includes a body portion configured to receive the beverage, a heat transfer element having a control temperature, a diverter member in fluid communication with and operably coupled to the body portion, the diverter member being positionable between a first position and a second position, and an aerator member in fluid communication with the diverter member. The heat transfer element carried by the body portion at a position adjacent the beverage, such that the heat transfer element is arranged to change a temperature of the beverage in the body portion from the first temperature to a second temperature different from the first temperature using the control temperature. The aerator member includes a plurality of flow features in an aeration pattern and an outlet.

The assembly in accordance with the first aspect also provides that when the diverter member is in the first position, the plurality of flow features of the aerator member are accessible such that the beverage flows through the body portion, along the plurality of flow features, and through the outlet, and when the diverter member is in the second position, the plurality of flow features of the aerator member are not accessible such that the beverage flows through the body portion and flows through the outlet while bypassing the plurality of flow features of the aerator.

In accordance with a second aspect, an assembly for selectively aerating and heating or cooling a beverage having a first temperature is disclosed. The assembly includes a body portion configured to receive the beverage, a heat transfer element having a control temperature, a support member removably coupled to the body portion, a disposable filter carried by the support member, a diverter member in fluid communication with and operably coupled to the support member, the diverter member being rotatable between a first position and a second position, and an aerator member in fluid communication with the diverter member. The body portion includes an upper portion having a plurality of surfaces protruding therefrom and a lower portion coupled to the upper portion, the lower portion spaced from the upper portion and forming an interior void volume therebetween. The heat transfer element includes a heat transfer material disposed within the interior void volume such that the heat transfer element is adjacent the beverage to change a temperature of the beverage in the body portion from the first temperature to a second temperature different from the first temperature using the control temperature. The aerator member includes a plurality of flow features in an aeration pattern, and an outlet.

The assembly in accordance with the second aspect also provides that when the diverter member is in the first position, the plurality of flow features of the aerator member are accessible such that the beverage flows through the body portion, along the plurality of flow features, and through the outlet, and when the diverter member is in the second position, the plurality of flow features of the aerator member are not accessible such that the beverage flows through the outlet while bypassing the plurality of flow features of the aerator member.

In accordance with a third aspect, a kit for selectively aerating and heating or cooling a beverage having a first temperature is disclosed. The kit includes an aeration device and a container having an opening configured to receive the aeration device. The aeration device includes a body portion configured to receive the beverage, a heat transfer element having a control temperature, a diverter member in fluid communication with and operably coupled to the body portion, the diverter member being positionable between a first position and a second position, and an aerator member in fluid communication with the diverter member, the aerator member including a plurality of flow features in an aeration pattern and an outlet.

The kit, in accordance with the third aspect, also provides that when the diverter member is in the first position, the plurality of flow features of the aerator member are accessible such that a beverage flows through the body portion, along the plurality of flow features, and through the outlet, and when the diverter member is in the second position, the plurality of flow features of the aerator member are not accessible such that the beverage flows through the body portion and flows through the outlet while bypassing the plurality of flow features of the aerator member.

In accordance with a fourth aspect, a method of cooling a beverage is disclosed. The method includes providing the assembly of either the first or second aspect; cooling the body portion of the assembly such that the heat transfer element reaches the control temperature; providing the beverage to the assembly; and rotating the diverter member to the first position or the second position.

In accordance with a fifth aspect, a method of filtering a beverage including providing the assembly of either the first or second aspect; placing a filter within the support member; providing the beverage to the assembly; and rotating the diverter member to the first position or the second position.

In accordance with the foregoing first, second, third, fourth, and/or fifth aspects, the aspects may further include any one or more of the following preferred forms.

In one preferred form, the diverter member is further positionable in a third position wherein the diverter member decouples from the body portion thereby separating the body portion from the diverter member.

In another preferred form, the assembly further includes a grip that is operably coupled to the body portion. The grip includes an outer surface and a plurality of channels extending vertically along a portion of the outer surface of the grip.

In another preferred form, the heat transfer element includes a heat transfer material disposed in an interior of the body portion.

In another preferred form, the heat transfer material includes a gel. The heat transfer material can be disposed in a pack.

In another preferred form, the aerator member includes a substantially vertical passage. The substantially vertical passage includes a nose portion having a first end and a second end, the first end having a first diameter and the second end having a second diameter that is less than the first diameter.

In another preferred form, the assembly further includes a support member that includes a plurality of support apertures disposed circumferentially around a perimeter of the support member and a plurality of protrusions extending radially outward from a central axis of the support member.

In another preferred form, the support member is removably coupled to the diverter member.

In another preferred form, the body portion includes a metal material that is configured to facilitate heat transfer from the heat transfer element to the beverage.

DETAILED DESCRIPTION

The present disclosure is directed to an assembly that selectively aerates a beverage such as, for example, wine. The assembly also includes a heat transfer element that changes the temperature (e.g., cools) of the beverage as it passes through the assembly. Optionally, the assembly can also include a filter pod that filters (i.e., removes) a chosen compound found in the beverage such as, for example, sulfites.

Figure 5:
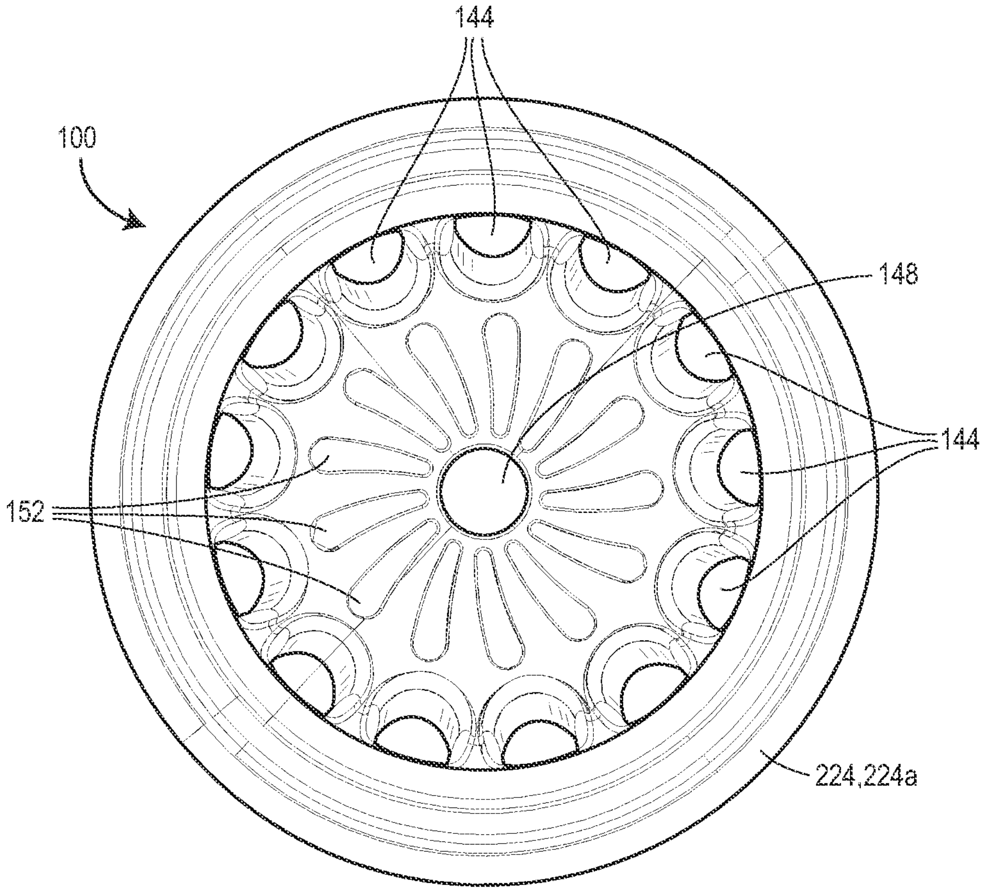
FIG. 5 is a top view of the assembly of FIG. 3.
Figure 6:
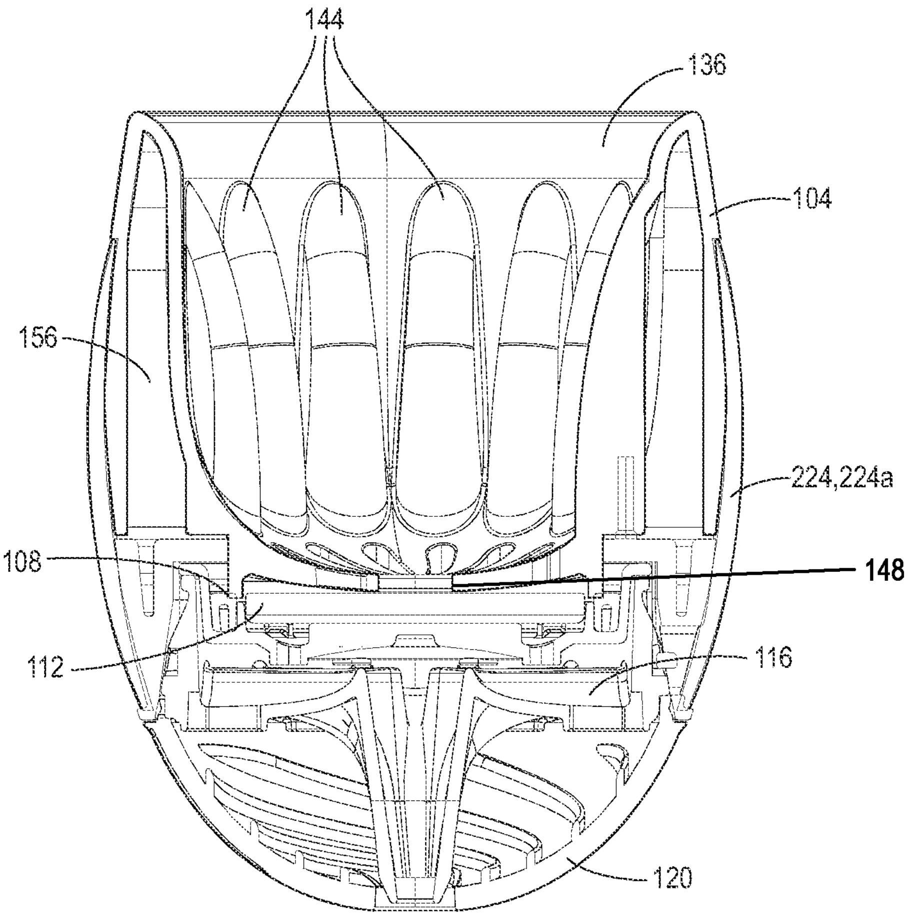
FIG. 6 is a cross-sectional view of FIG. 4.

FIGS. 1-7 illustrate an example assembly 100 constructed in accordance with the teachings of the present disclosure. The assembly 100 includes a body portion 104, a support member 108, a disposable filter 112 retained by the support member 108, a diverter member 116, an aerator member 120, and a heat transfer element 132 carried by the body portion 104 for changing the temperature of the beverage as it passes through the body portion 104. The body portion 104 is removably coupled to the remaining components of the assembly 100—the support member 108, the disposable filter 112, the diverter member 116, and the aerator member 120. As best illustrated in FIG. 6, the disposable filter 112 is disposed within and supported by the support member 108. The diverter member 116 releasably receives the support member 108 such that the support member 108 can be disposed in or easily removed from the diverter member 116 when the support member 108 and the diverter member 116 are properly aligned. The aerator member 120 releasably receives the diverter member 116 such that when the aerator member 120 is rotated relative to the body portion 104, the diverter member 116 and the aerator member 120 remain secured to one another. Thus, when the aerator member 120 is rotated relative to the body portion 104, the diverter member 116 also rotates relative to the body portion 104.

Figure 1:
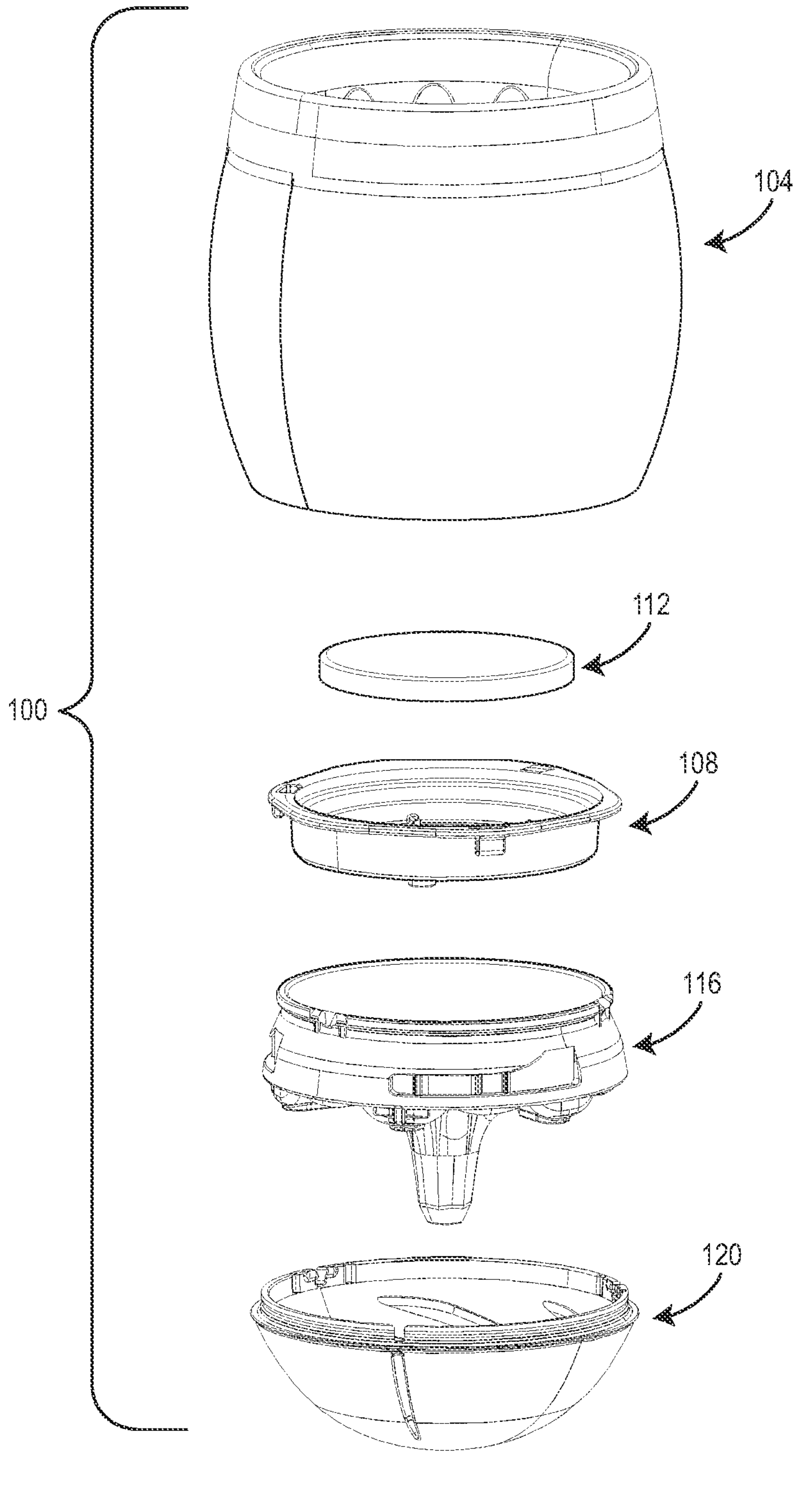
FIG. 1 is an exploded view of an example assembly for selectively aerating a beverage, constructed in accordance with the present disclosure.
Figure 2:
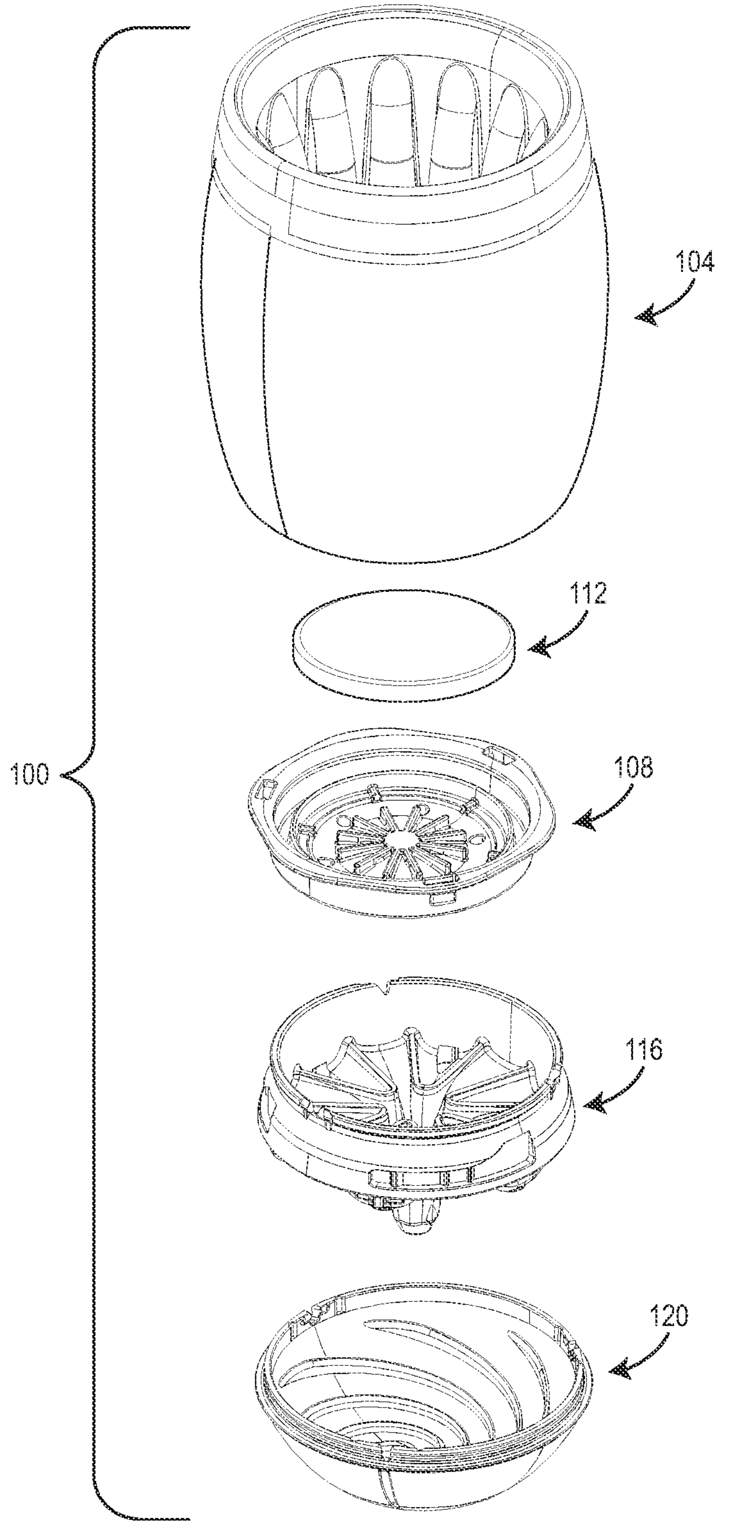
FIG. 2 is a perspective view of the assembly of FIG. 1.
Figure 3:
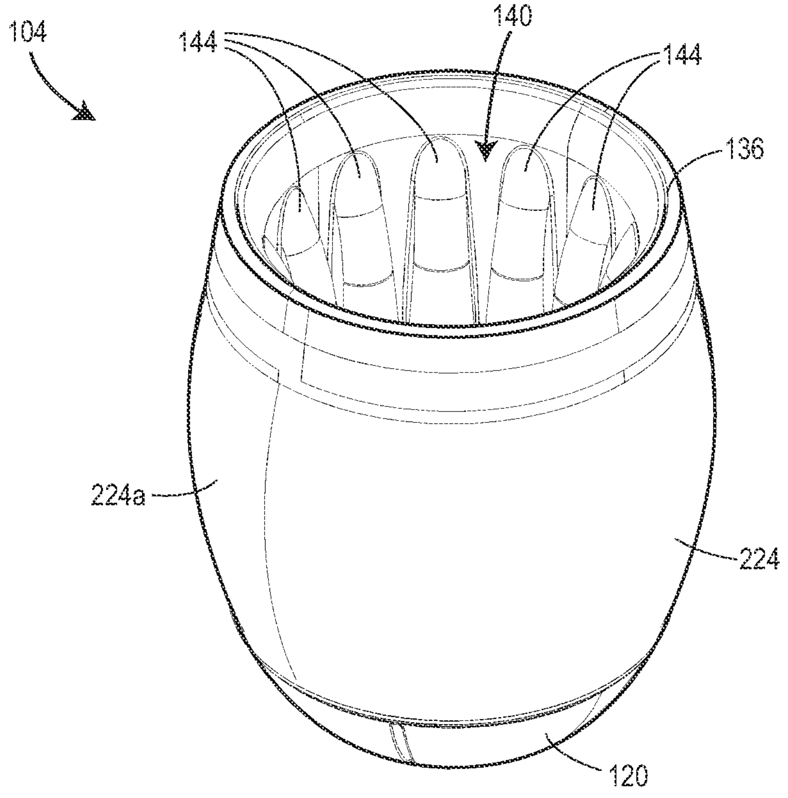
FIG. 3 is a perspective view of the assembly of FIG. 1 in an assembled configuration.
Figure 4:
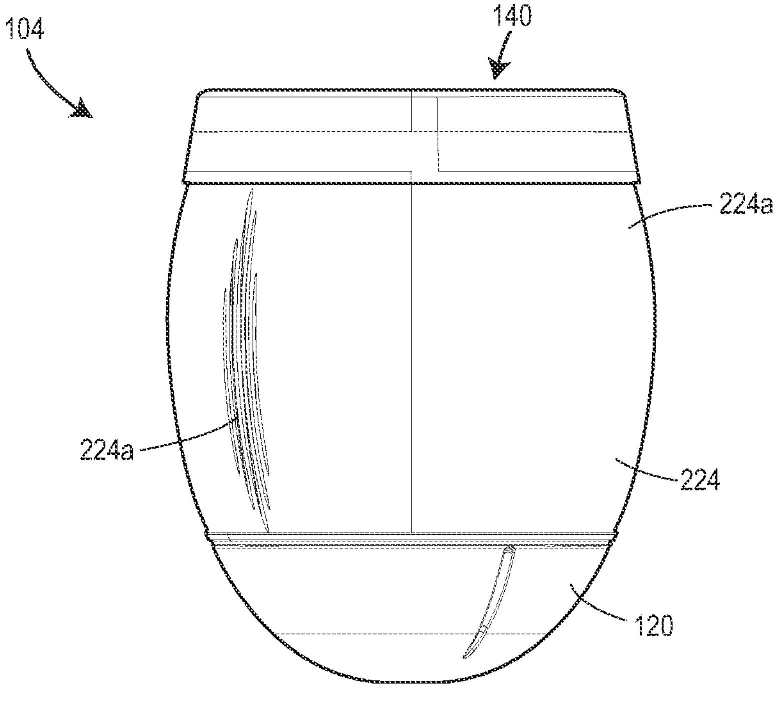
FIG. 4 is a side view of the assembly of FIG. 3.
Figure 7:
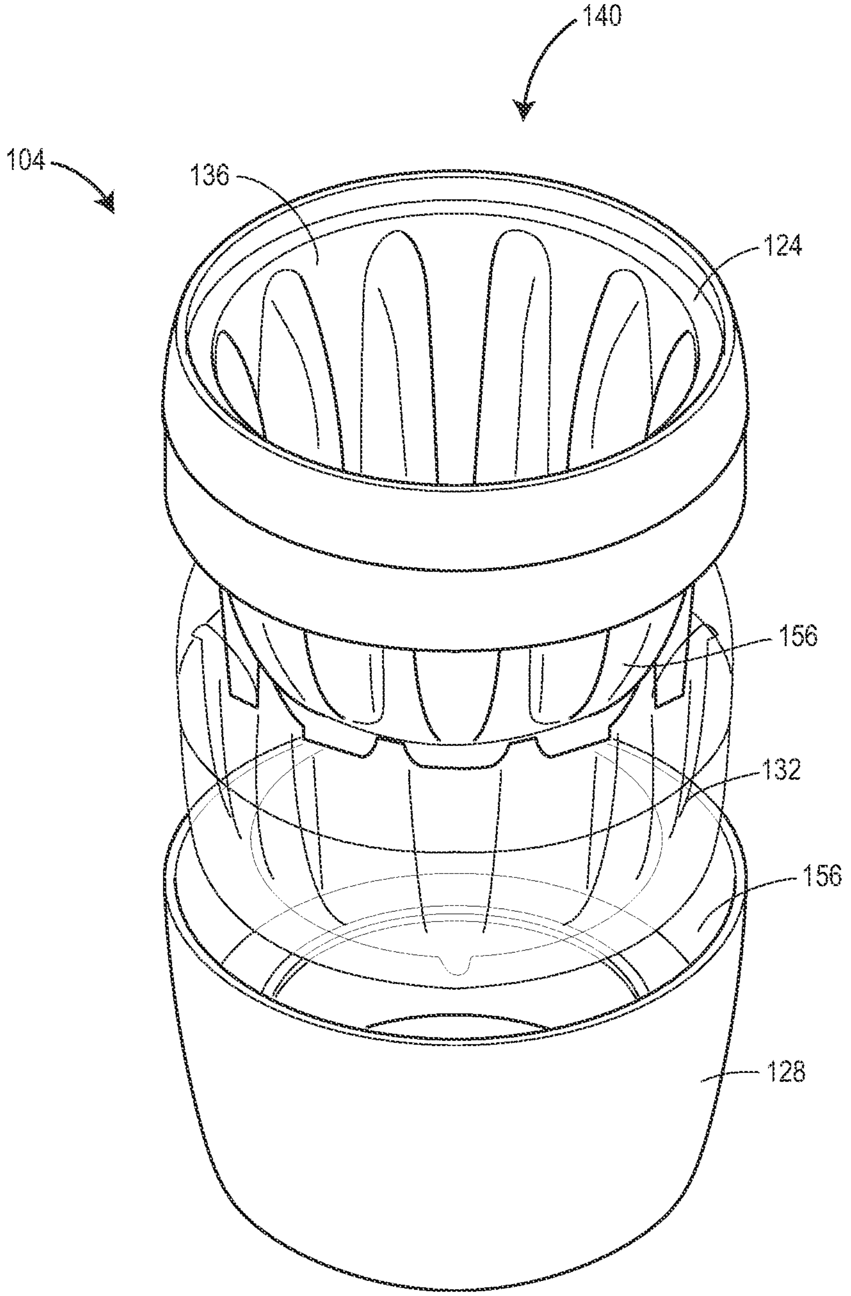
FIG. 7 is a perspective and exploded view of a body portion of the assembly of FIG. 1.

The body portion 104 generally includes an upper portion 124, a lower portion 128 coupled to the upper portion 124, and the heat transfer element 132 is, at least in this example, disposed between the upper and lower portions 124, 128, as best illustrated in FIG. 7. As illustrated in FIGS. 3, 5, and 6, the upper portion 124 of the body portion 104 includes an inner surface 136 that forms an inlet 140 configured to receive a beverage (e.g., wine), a plurality of surfaces 144 protruding inward from the inner surface 136 (such that the plurality of surfaces 144 may also be referred to herein as the plurality of protrusions 144), and an opening 148 disposed opposite the inlet 140 that is in fluid communication with the support member 108 when the body portion 104 is coupled thereto.

The plurality of surfaces 144 extend from the inner surface 136 such that the plurality of surfaces 144 interact with the beverage entering through the inlet 140 and passing through the upper portion 124 of the body portion 104. In particular, the plurality of surfaces 144 extend from the inner surface 136 such that the largest amount of surface area of each surface in the plurality of surfaces 144 interacts with the beverage passing through the upper portion 124 of the body portion 104. In the example illustrated in FIGS. 3, 5, and 6, the plurality of surfaces 144 are rounded columns having an arcuate shape that begin extending from the inner surface 136 proximate the inlet 140 and extend downwardly toward the opening 148 of the upper portion 124. In other examples, the plurality of protrusions 144 can instead be a plurality of fins, a plurality of dots, a plurality of cubes, a plurality of pyramids, one or more other suitably shaped objects, and/or combinations thereof. In any example of the body portion 104, the plurality of protrusions 144 extend from the inner surface 136 in a manner that causes the maximum amount of surface area of each protrusion in the plurality of protrusions 144 to interact with the beverage passing through the upper portion 124 of the body portion 104.

The opening 148 in the inner surface 136 of the upper portion 124 permits the beverage poured into the body portion 104 through the inlet 140 to access the other components of the assembly 100. As best illustrated in FIGS. 5 and 6, the opening 148 is disposed coaxial with a central axis of the upper portion 124, and a plurality of apertures 152 are disposed symmetrically around the opening 148. The plurality of apertures 152 extend radially outward from the opening 148 and increase in diameter as they extend away from the opening 148.

Meanwhile, the lower portion 128 of the body portion 104 has a substantially cylindrical hollow shape. Thus, when the lower portion 128 is coupled to the upper portion 124, an interior void volume 156 is formed between the upper portion 124 and the lower portion 128. The interior void volume 156 includes, at least in this example, the space between the upper and lower portions 124, 128 and the space created by the plurality of surfaces 144 protruding from the inner surface 136 of the upper portion 124. In other examples, the interior void volume 156 can be defined differently (e.g., by other portions of the assembly 100). In one other example, the body portion 104 may not include the plurality of surfaces 144, in which case the interior void volume 156 would not include the space created by the plurality of surfaces 144 protruding from the inner surface 136 of the upper portion 124.

The heat transfer element 132 is disposed in the interior void volume 156, such that the heat transfer element 132 is thermally coupled to the interior of the body portion 104. The heat transfer element 132 has and maintains a desired temperature (for a certain duration), i.e., a control, or desired, temperature, that is typically different than the temperature of the beverage passing through the body portion 104. In this example, the heat transfer element 132 is a heat transfer material such as, for example, a liquid, a solid, or a gel capable of maintaining the desired temperature, such that when the beverage passes through the body portion 104, heat can transfer between the beverage and the heat transfer material to change the temperature of the beverage in accordance with the desired temperature. For example, the heat transfer material can be a solution of alcohol and water. As another example, the heat transfer material can be other aqueous solutions containing salts or urea, or gels comprised of glycerol, absorbent polymers, glycols, or silica. In some examples, the heat transfer material is disposed or carried in a pack, pad, or other receptacle disposed in the interior void volume 156. In other examples, the heat transfer material can be directly disposed in the interior void volume 156 without such a receptacle. In any event, the base portion 104 can be placed in a refrigerator or freezer (or cooled in another manner) for a duration long enough to allow the heat transfer element 132 (e.g., the solution of alcohol and water) to be cooled to reach the desired temperature. Once the heat transfer element 132 (e.g., the solution) reaches the desired temperature, the heat transfer element 132 (e.g., the solution) will be at an optimal temperature to efficiently lower the temperature of the beverage as it passes over the plurality of surfaces 144. Conversely, the base portion 104 can be heated so that the heat transfer element 132 is heated to reach the desired temperature, which allows the heat transfer element 112 to efficiently increase the temperature of the beverage as it passes over the plurality of surfaces 144. In any event, the heat transfer element 132 can change the temperature of the beverage as it passes over the plurality of surfaces 144 protruding from the inner surface 136. For example, the heat transfer element 132 can maintain a temperature that is colder than the beverage passing through the body portion, and because the heat transfer element 132 is disposed in the interior void volume 156, the heat transfer element 132 decreases the temperature of the beverage as it passes through the body portion 104 (and more particularly through the inlet 140 and over the plurality of surfaces 144).

The body portion 104 may be formed of any material capable of efficiently transferring heat, or cold, from the heat transfer element 132 to the beverage passing through the body portion 104. In this example, the body portion 104 is formed of a metal material such as aluminum or Stainless Steel. In other examples, however, the body portion 104 may be made of one or more different materials such as plastics (e.g., polypropylene or acrylonitrile butadiene styrene ("ABS"), thermoplastic elastomers, or silicone elastomers).

Turning now to FIGS. 8-11, the support member 108 is configured to retain the disposable filter 112 in a substantially flat orientation. Retaining the disposable filter 112 in a substantially flat orientation allows the beverage to interact with the greatest amount of filter media in the disposable filter 112 as the beverage passes through the disposable filter 112. To this end, the support member 108 includes a substantially circular base 160, an outer wall 164 extending transversely from the base 160, and an inner wall 184 extending transversely from the base 160 and disposed radially inward from the outer wall 164. The outer wall 164 extends transversely from a perimeter of the base 160. The support member 108 also includes a lip 176 that extends perpendicularly from the outer wall 164. So configured, the lip 176 forms a ledge that extends radially outward from the outer wall 164.

Figure 8:
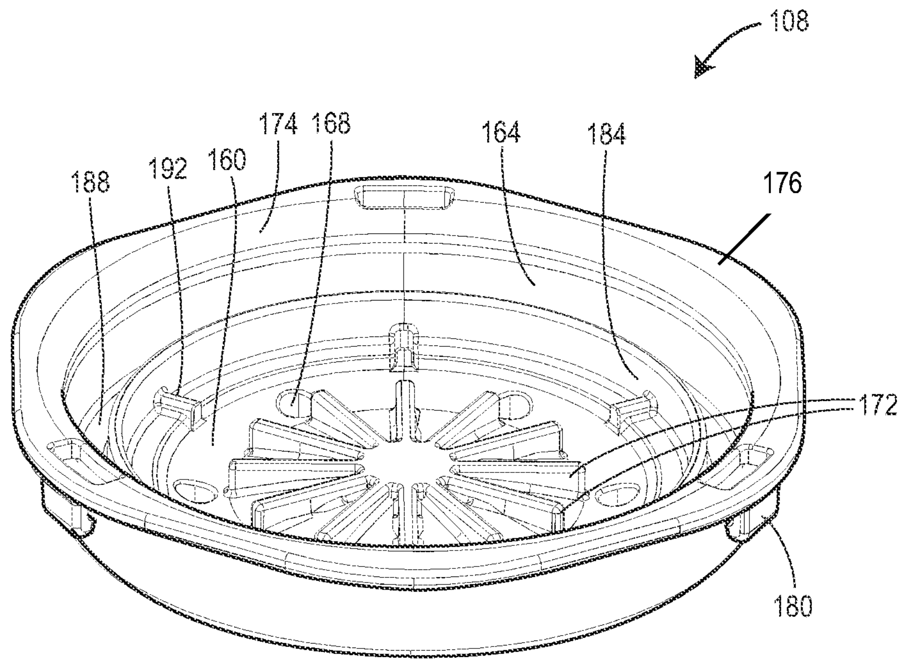
FIG. 8 is a perspective view of a support member of the assembly of FIG. 1.
Figure 9:
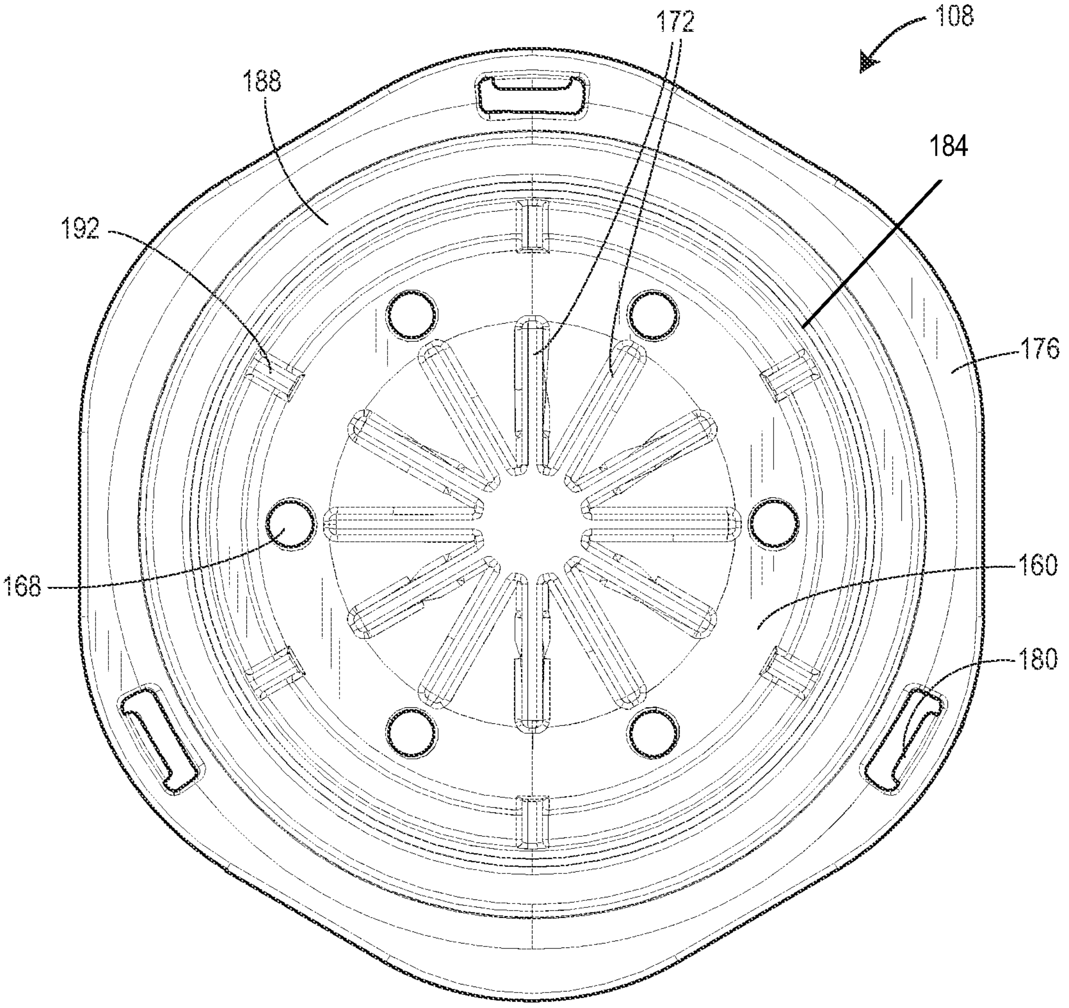
FIG. 9 is a top view of the support member of FIG. 8.
Figure 10:
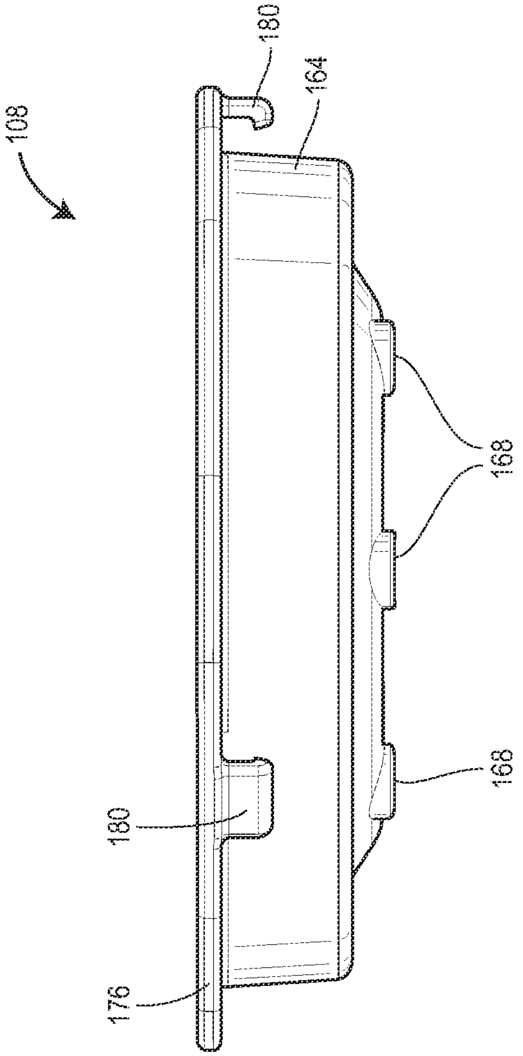
FIG. 10 is a side view of the support member of FIG. 8.
Figure 11:
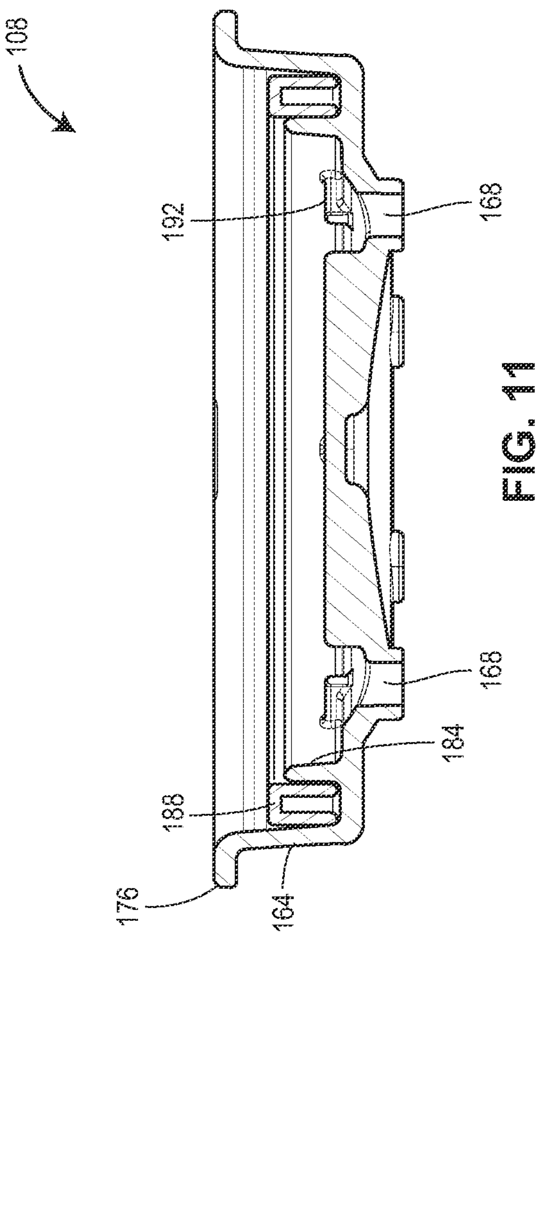
FIG. 11 is a cross-sectional view of the support member of FIG. 10.

As illustrated in FIGS. 8 and 9, the lip 176 can in some examples extend radially outward from the outer wall 164 in a non-uniform manner. As such, the lip 176 includes portions that extend radially outwardly more than the remainder of the lip 176. The portions of the lip 176 that extend further outwardly can engage the body portion 104 and limit, or restrict, rotation of the support member 108 relative to the assembly 100. A plurality of hooks 180 can also extend downwardly from the lip 176 and releasably couple the support member 108 to the diverter member 116. The inner wall 184 is disposed radially inward from the wall 164 by a distance great enough for a sealing ring 188 to be disposed between the outer wall 164 and the inner wall 184.

The support member 108 also includes a plurality of support apertures 168 disposed circumferentially around the base 160 and a plurality of protrusions 172 extending radially outward from and circumferentially around a central axis of the base 160. The plurality of support apertures 168 and the plurality of protrusions 172 are disposed on the base 160 of the support member 108 within a perimeter of the inner wall 184, such that the inner wall surrounds the apertures 168 and the protrusions 172. The plurality of support apertures 168 provide a fluid pathway for the beverage to pass from the support member 108 to the diverter member 116. In particular, the plurality of support apertures 168 cause the beverage to pass through each support aperture 168 in the plurality of support apertures 168 as droplets. In doing so, the beverage is aerated as it passes through the plurality of support apertures 168. As best illustrated in FIG. 9, the plurality of support protrusions 172 are disposed symmetrically around the central axis of the base 160. In the illustrated example of FIG. 9, each support aperture 168 in the plurality of support apertures 168 is disposed at the end of a support protrusion 172. The support protrusions 172 in the plurality of support protrusions 172 that do not have a support aperture 168 disposed at the end thereof instead have a support protrusion extension 192 disposed proximate the respective support protrusion 172. Each support protrusion extension 192 is disposed proximate the secondary wall 184 and in-line with certain support protrusions 172 of the plurality of support protrusions 172. The support protrusion extensions 192 and the plurality of support protrusions 172 are thus configured to receive the disposable filter 112 and maintain the disposable filter 112 in the substantially flat orientation.

While FIGS. 8-11 illustrate one example of a support member 108, FIGS. 12-15 illustrate different examples of support members 208, 308, 408, 508, respectively, that are constructed in accordance with the present disclosure and can be used instead of the support member 108. The support members 208, 308, 408, 508 of FIGS. 12-15 similarly include a base 260, 360, 460, 560, respectively, and an outer wall 264, 364, 464, 564, respectively, extending transversely from the base 260, 360, 460, 560. However, unlike the support member 108 of FIGS. 8-11, the support members 208, 308, 408, 508 of FIGS. 12-15, respectively, include different examples of the plurality of support apertures 268, 368, 468, 568, respectively, and different examples of the plurality of support protrusions 272, 372, 472, 572, respectively.

Figure 12:
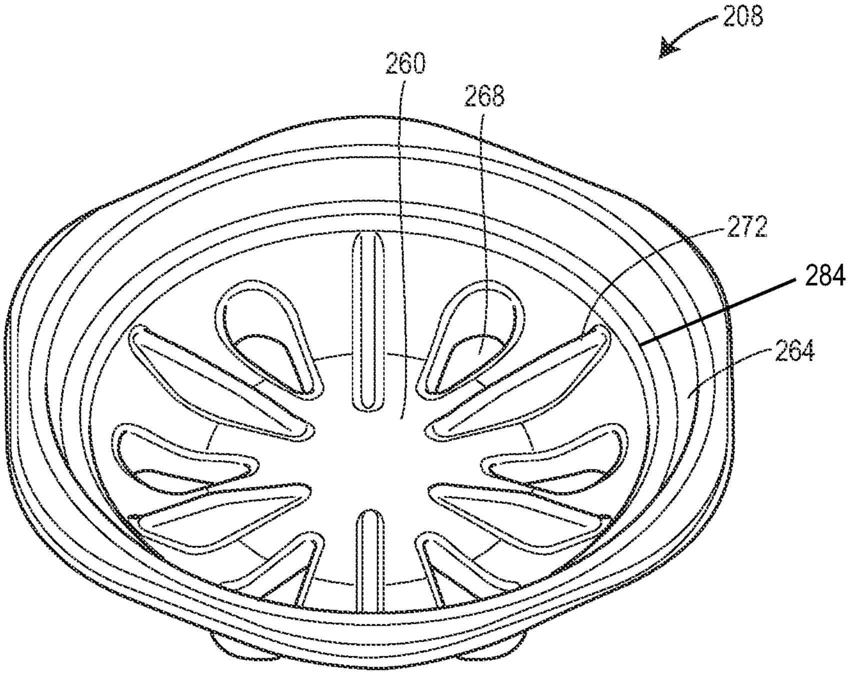
FIG. 12 is a perspective view of another example of a support member that can be used instead of the support member of FIGS. 8-11, constructed in accordance with the present disclosure.

In the example support member 208 illustrated in FIG. 12, the plurality of support apertures 268 are shaped as droplets and are disposed proximate a secondary wall 284. The plurality of support protrusions 272 extend radially inward from the secondary wall 284 toward a central axis of the base 260. Meanwhile, each support protrusion 272 of the plurality of support protrusions 272 of FIG. 12 is a chamfered rib.

Figure 13:
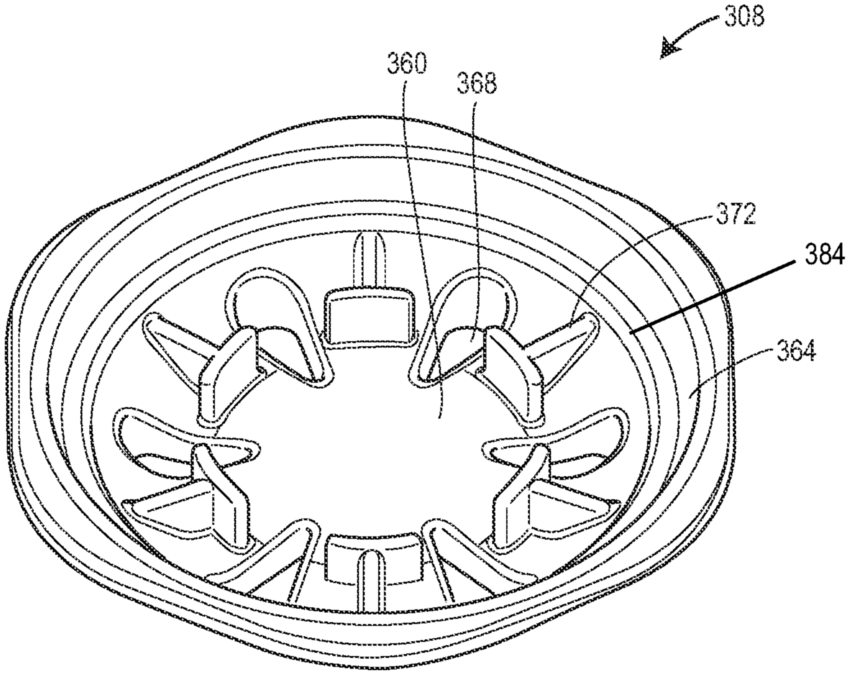
FIG. 13 is a perspective view of another example of a support member that can be used instead of the support member of FIGS. 8-11, constructed in accordance with the present disclosure.

In the example support member 308 illustrated in FIG. 13, the plurality of support apertures 368 are similarly shaped as droplets and are disposed proximate a secondary wall 384. The plurality of support protrusions 372 extend radially inward from the secondary wall 384 toward a central axis of the support member 308 for a distance. However, unlike the plurality of support protrusions 272, each support protrusions 372 in the plurality of support protrusions 372 of FIG. 13 is a rib that has a T-shaped cross-section.

Figure 14:
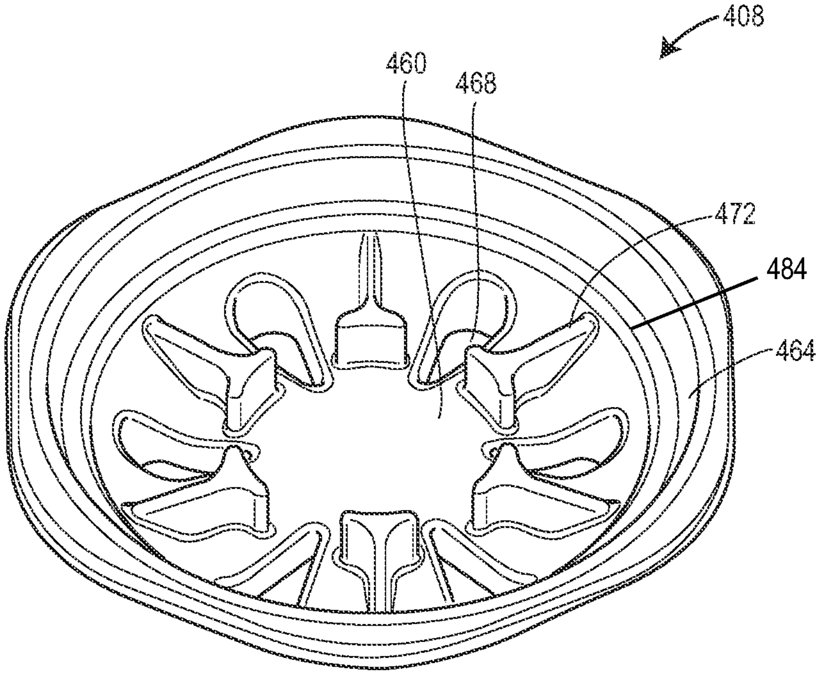
FIG. 14 is a perspective view of another example of a support member that can be used instead of the support member of FIGS. 8-11, constructed in accordance with the present disclosure.

In the example support member 408 illustrated in FIG. 14, the plurality of support apertures 468 are similarly shaped as droplets and are disposed proximate a secondary wall 484. The plurality of support protrusions 472 extend radially inward from the secondary wall 484 toward the central axis of the support member 408 for a distance. However, unlike the plurality of support protrusions 272 and 372, each support protrusion 472 in the plurality of support protrusions 472 of FIG. 14 is a filleted rib having a T-shaped cross-section.

Figure 15:
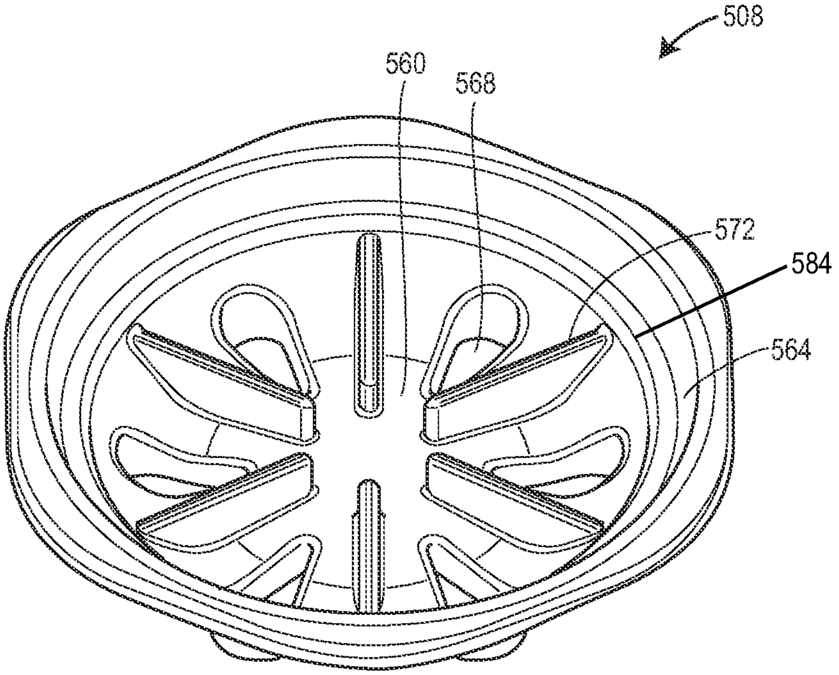
FIG. 15 is a perspective view of another example of a support member that can be used instead of the support member of FIGS. 8-11, constructed in accordance with the present disclosure.

In the example illustrated in FIG. 15, the plurality of support apertures 568 are similarly shaped as droplets and are disposed proximate a secondary wall 584. The plurality of support protrusions 572 extend radially inward from the secondary wall 584 toward the central axis of the support member 508 for a distance. However, unlike the plurality of support protrusions 272, 372, and 472, each support protrusion 572 in the plurality of support protrusions 572 in FIG. 15 is a rib having a uniform height from a first end of the rib (coupled to the secondary wall 584) to a second end of the rib.

Figure 16:
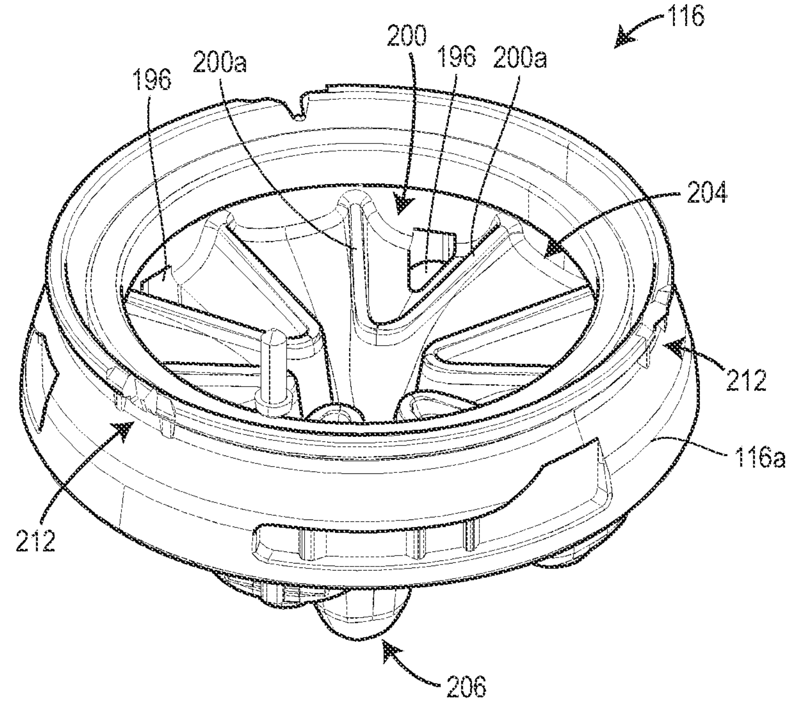
FIG. 16 is a perspective view of a diverter member of the assembly of FIG. 1.
Figure 17:
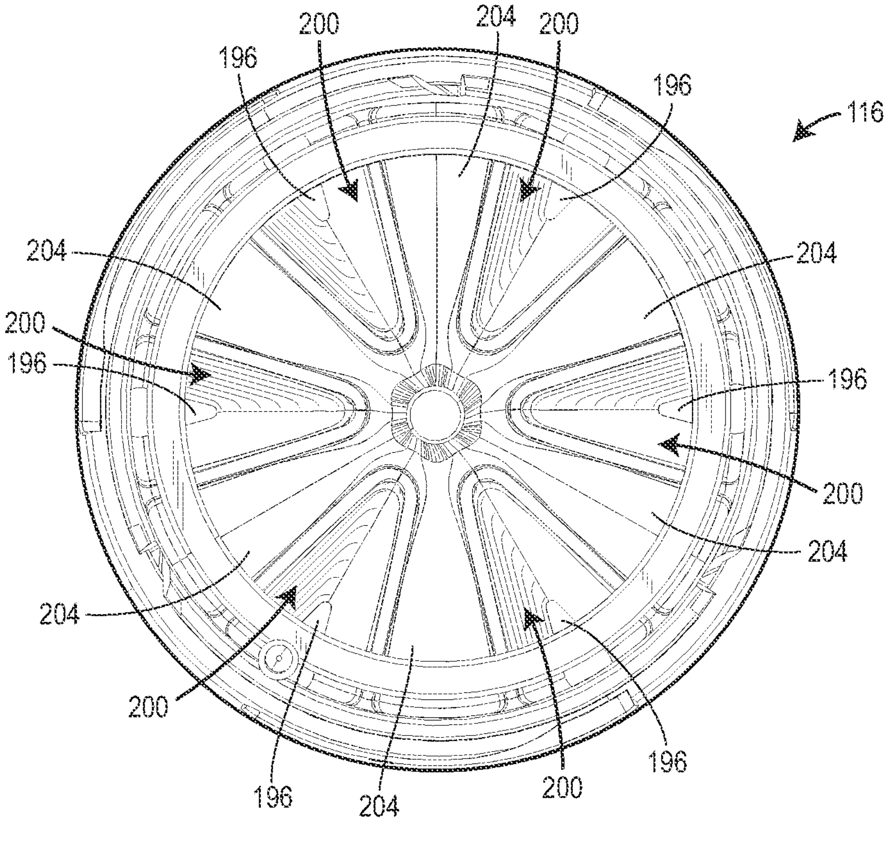
FIG. 17 is a top view of the diverter member of FIG. 16.
Figure 18:
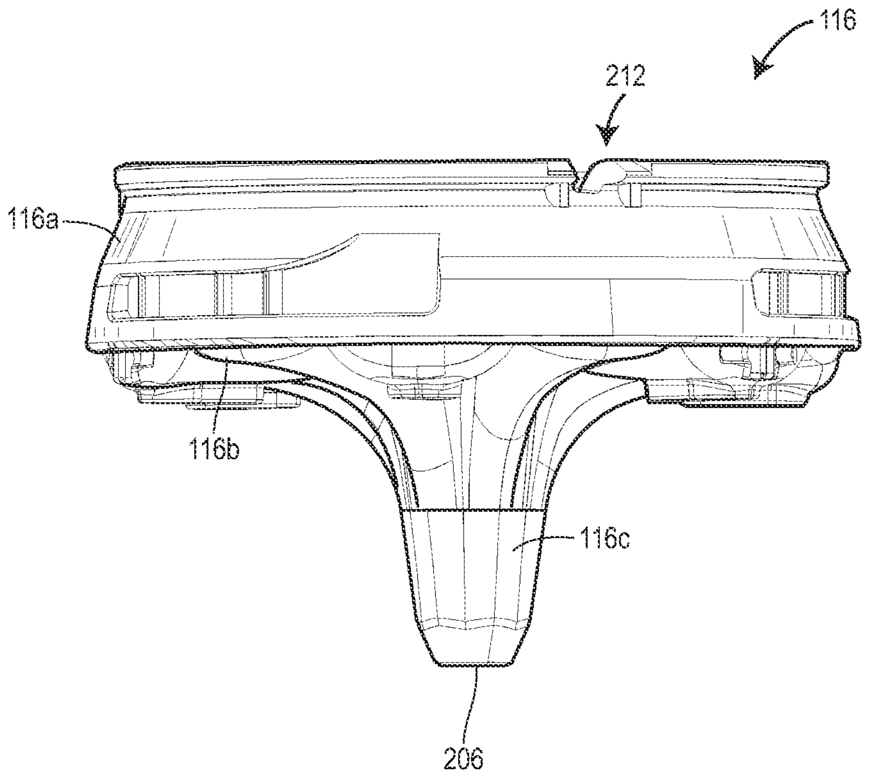
FIG. 18 is a side view of the diverter member of FIG. 16.

Turning now to FIGS. 16-18, further details of the diverter member 116 will now be described. The diverter member 116 is in fluid communication with and operably coupled to the body portion 104. In particular, the diverter member 116 is rotatably coupled to the support member 108 and body portion 104. As will be discussed in greater detail below, the diverter member 116 is rotatable, relative to the body portion 104, between several positions and, depending on the position of the diverter member 116, directs the beverage passing through the assembly 100 to different portions of the diverter member 116. So configured, the diverter member 116 can be positioned so as to aerate the beverage passing through the diverter member 116 or can be positioned so as to have the beverage pass through the diverter member 116 without being aerated.

As illustrated, the diverter member 116 includes a cylindrical wall **116*a* that extends upwardly from a diverter base 116*b*. The cylindrical wall 116*a* includes a plurality of diverter securement features 212 that receive the plurality of hooks 180 that extend from the support member 108. The diverter securement features 212 retain the plurality of hooks 180 such that the diverter member 116 can rotate relative to the support member 108. As will be discussed in further detail below, this configuration allows the diverter member 116 to be rotatable between several positions, each of which has a different effect on the aeration of the beverage passing through the assembly 100**.

The diverter member 116 also includes a plurality of primary apertures 196, a plurality of troughs 200 surrounding each primary aperture 196 of the plurality of primary apertures 196, a plurality of channels 204, and a secondary outlet 206. Each trough 200 in the plurality of troughs 200 is defined by a pair of side walls **200*a* that surround the respective primary aperture 196 such that the beverage flowing through the plurality of support apertures 168 of the support member 108 flows into the troughs 200 and flows through the primary apertures 196. Opposing surfaces of the side wall 200*a* converge radially inward from an inner surface of the cylindrical wall 116*a* toward a central axis of the diverter member 116. The plurality of channels 204 are disposed between the plurality of troughs 200, respectively. Each channel 204 in the plurality of channels 204 is disposed between adjacent troughs 200 and extends from the inner surface of the cylindrical wall 116*a* to the secondary outlet 206 of the diverter member 116. In this manner, the plurality of channels 204 form a nose portion 116*c* of the diverter member 116**.

Figure 22:
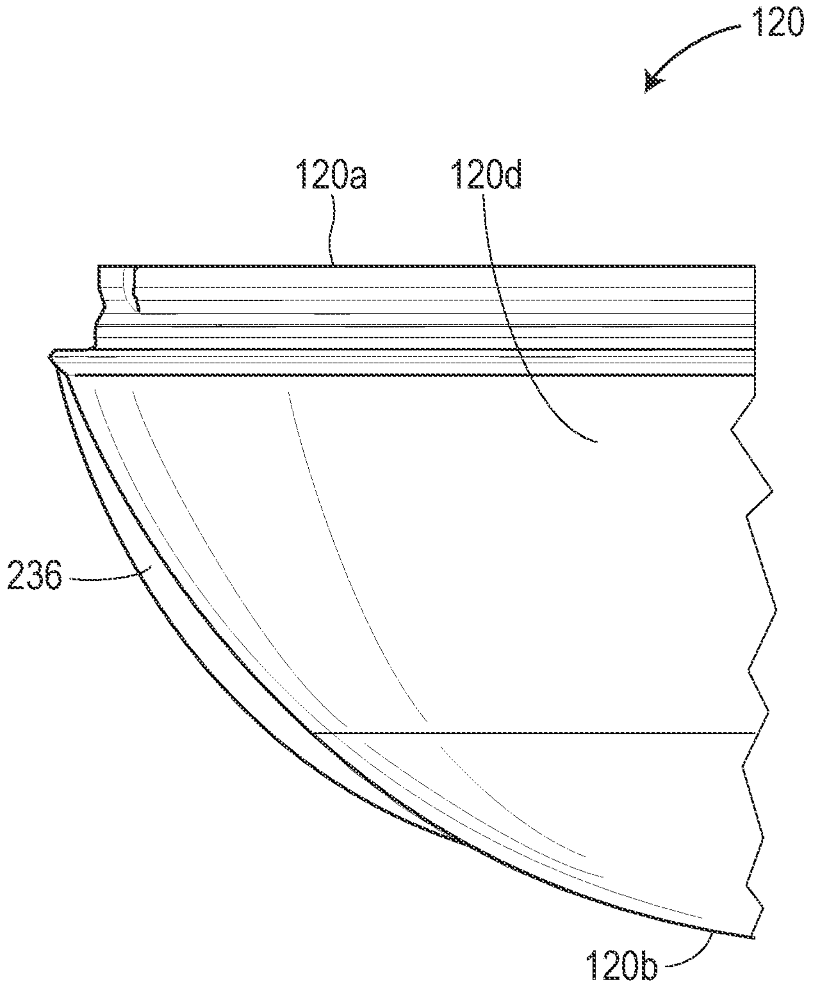
FIG. 22 is a detailed side view of a portion of the aerator member of FIG. 19.

Turning now to FIGS. 19-22, further details of the aerator member 120 will now be described. The aerator member 120 includes a first end 120*a*, a second end 120*b* opposite the first end 120*a*, an inner surface 120*c*, an outer surface 120*d*, and an outlet 220 disposed at the second end 120*b*. The first end 120*a* of the aerator member 120 is non-rotatably secured to the diverter member 116. In particular, the first end 120*a* of the aerator member 120 is secured to the diverter member 116 using any mechanical fastening mechanism such as, for example, a snap fit. In this example, the aerator member 120 has a generally parabolic cross-sectional shape and, as best illustrated in FIG. 22, includes an outer rib 236 that extends along a portion of the outer surface 120*d*. The outer rib 236 acts as a gripping surface against which a user could place his/her hand to turn the aerator member 120 and the diverter member 116 by virtue of being coupled to the aerator member 120. In other examples, the aerator member 120 can include multiple outer ribs 236 or other features that can provide such a gripping surface.

Figure 19:
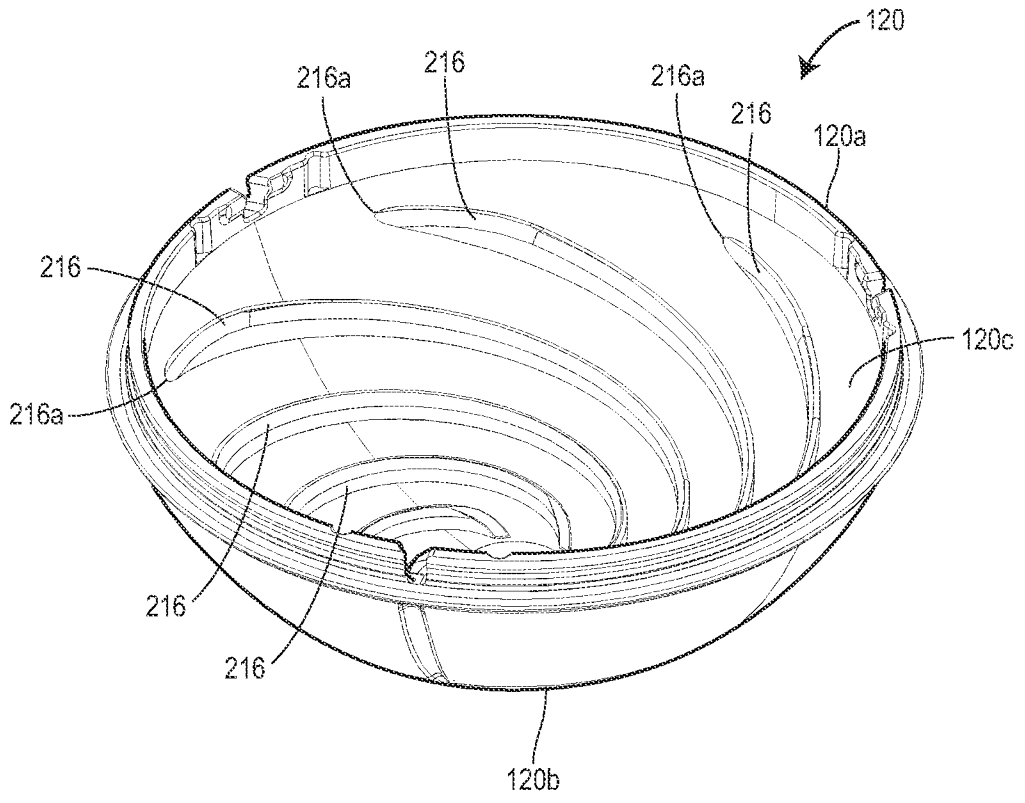
FIG. 19 is a perspective view of an aerator member of the assembly of FIG. 1.
Figure 20:
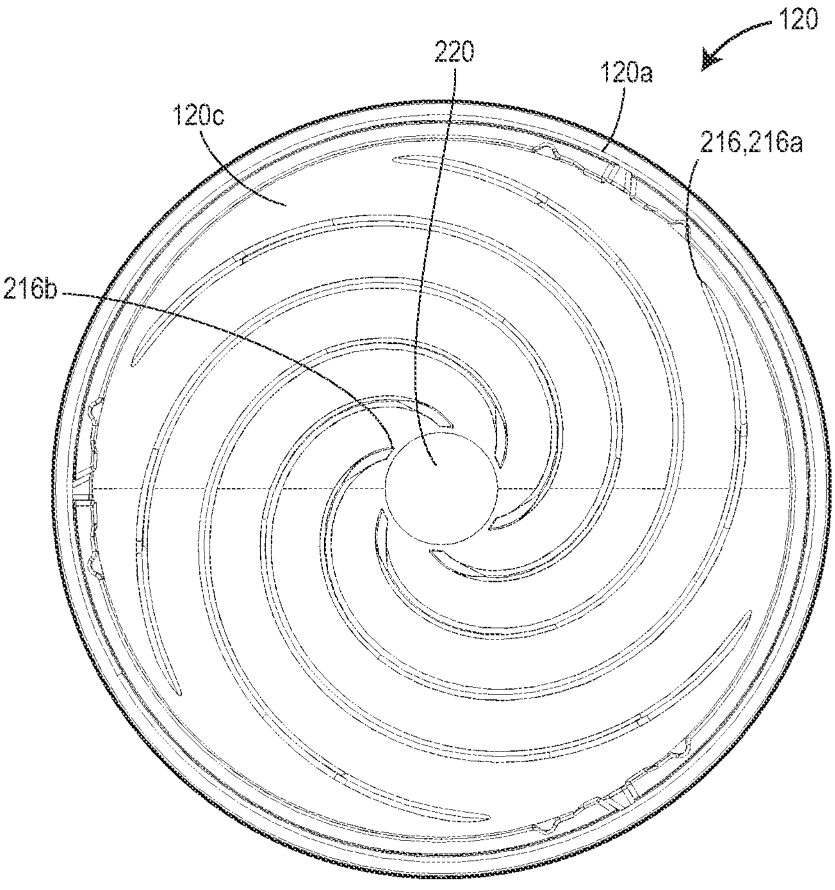
FIG. 20 is a top view of the aerator member of FIG. 19.
Figure 21:
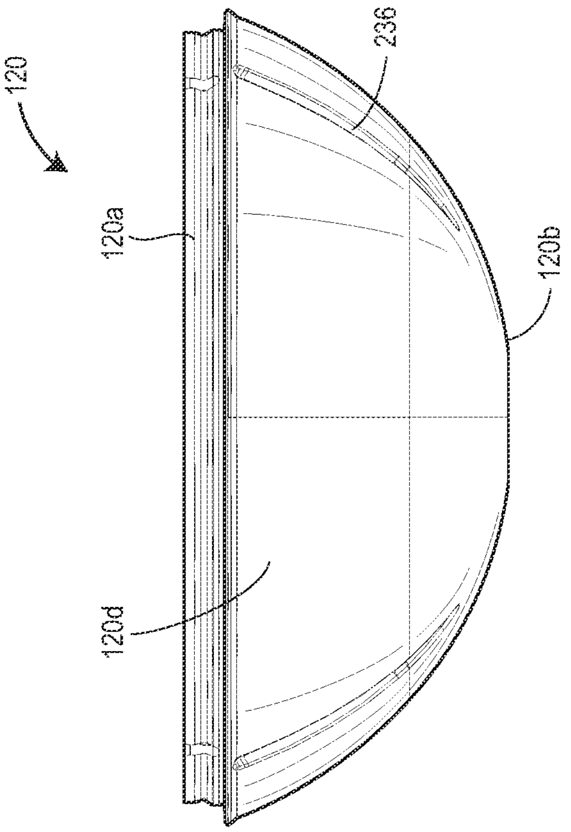
FIG. 21 is a side view of the aerator member of FIG. 19.

As illustrated in FIGS. 19 and 20, the aerator member 120 also has a plurality of flow features 216 disposed on and extending along the inner surface 120*c* of the aerator member 116. Each flow feature 216 of the plurality of flow features 216 is raised and elongated from a first end 216*a* to a second end 216*b* positioned more proximate to the second end 120*b*. In particular, the first end 216*a* of each flow feature 216 of the plurality of flow features 216 is disposed toward the first end 120*a* of the aerator member 120 and extends in a spiral on or along the inner surface of the aerator member 116 toward the second end 120*b* of the aerator member 120. That is, each flow feature 216 of the plurality of flow features 216 is disposed a vertical distance from every other flow feature in the plurality of flow features 216. So configured, the beverage flowing from the primary apertures 196 of the diverter member 116 contacts a portion of a flow feature 216 and flows into engagement with another portion of an adjacent flow feature 216 (and so on) until the beverage reaches the outlet 220. In doing so, each flow feature 216 of the plurality of flow features 216 maximizes the flow path length of the beverage (e.g., red wine) through the aerator member 120, thereby aerating the beverage prior to the beverage exiting the outlet 220.

As briefly discussed above, the diverter member 116 is rotatably coupled to the body portion 104 of the assembly 100 such that the diverter member 116 may be rotated into several positions, depending on whether or not the user would like to aerate the beverage passing through the assembly. In particular, the diverter member 116 is positionable between a first position and a second position.

When the diverter member 116 is in the first position, the plurality of support apertures 168 of the support member 108 are aligned with the plurality of troughs 200 of the diverter member 116. In turn, the beverage poured into the body portion 104 flows to the support member 108, passes through the disposable filter 112 (which filters, for example, sulfites from the beverage), flows through the plurality of support apertures 168 of the support member 108, and enters the plurality of troughs 200 of the diverter member 116. Once the beverage enters the plurality of troughs 200 of the diverter member 116, the beverage flows onto the plurality of flow features 216 of the aerator member 120. As the beverage flows along the plurality of flow features 216 and out through the outlet 220, the beverage (e.g., red wine) aerates.

When the diverter member 116 is in the second position, the plurality of support apertures 168 of the support member 108 are aligned with the plurality of channels 204 of the diverter member 116. In turn, the beverage poured into the body portion 104 flows to the support member 108, passes through the disposable filter 112, flows through the plurality of support apertures 168 of the support member 108, and enters the plurality of channels 204 of the diverter member 116. Once the beverage enters the plurality of channels 204 of the diverter member 116, the beverage flows along the channels and to the secondary outlet 206 of the diverter member 116. In turn, the beverage (e.g., white wine) passes from the secondary outlet 206 of the diverter member 116 and through the outlet 220 of the aerator member 120, thereby bypassing the plurality of flow features 216 of the aerator member 120. In other words, when the diverter member 116 is in the second position, the plurality of flow features 216 of the aerator member 120 are not accessible. In any event, so configured, the beverage passes through the assembly 100 without being aerated.

It will also be appreciated that the diverter member 116 is further positionable in a third position in which the diverter member 116 can be removed from the body portion 104. The third position may, for example, be after the second position. In the third position, the diverter member 116 may be removed from the body portion 104, thereby providing access to the internal components of the body portion 104. So configured, the filter 112 may be accessed and removed (e.g., after the useful life of the filter 112 has passed), and a new filter 112 placed in the support member 108. While the third position can be after the second position, in other examples, the third position can be between the first and second positions or before the first position.

Figure 23:
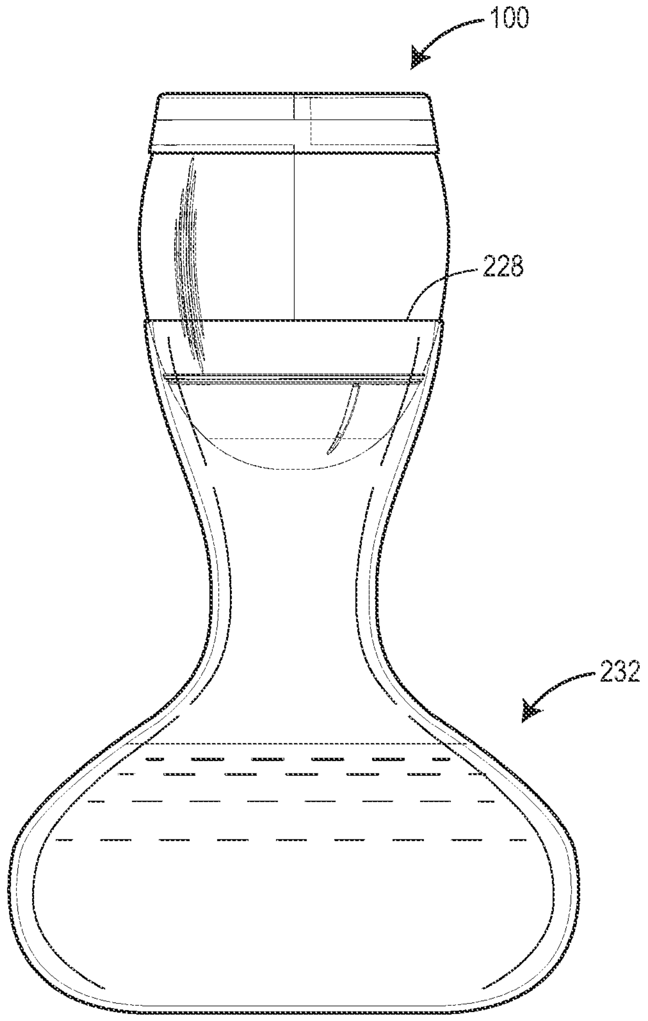
FIG. 23 is a side view of the assembly of FIG. 3 disposed in an example of a container, constructed in accordance with the present disclosure.

With reference back to FIGS. 3 and 4, the assembly 100 can also include a grip 224 that is carried on the body portion 104 of the assembly 100. In some examples, the grip 224 can be removably coupled to the body portion 104 of the assembly 100, whereas in other examples the grip 224 can be fixedly coupled to the body portion 104. In any event, the grip 224 includes an outer surface 224*a* and a plurality of vertical channels 224*b* extending along a portion of the outer surface. The vertical channels 224*b* allow for air to pass between the grip 224 and the walls of a container (e.g., a carafe, a glass) that the assembly 100 is placed within. For example, as illustrated in FIG. 23, the assembly 100 is placed within an opening 228 of a carafe 232. As the beverage is poured into the assembly 100 and flows into the carafe 232 below, air that is displaced by the beverage entering the container 232 can pass between the walls of the container 232 and the assembly 100 (and out of the container 232) by passing through the vertical channels 224*b*.

While various embodiments have been described above, this disclosure is not intended to be limited thereto. Variations can be made to the disclosed embodiments that are still within the scope of the appended claims.

The invention claimed is:

1. An assembly for selectively aerating and heating or cooling a beverage having a first temperature, the assembly comprising:

a body portion configured to receive the beverage;

a heat transfer element having a control temperature, the heat transfer element carried by the body portion at a position adjacent the beverage, such that the heat transfer element is arranged to change a temperature of the beverage in the body portion from the first temperature to a second temperature different from the first temperature using the control temperature;

a diverter member in fluid communication with and operably coupled to the body portion, the diverter member being positionable between a first position and a second position; and an aerator member in fluid communication with the diverter member, the aerator member including a plurality of flow features in an aeration pattern, and an outlet;

wherein, when the diverter member is in the first position, the plurality of flow features of the aerator member are accessible such that the beverage flows through the body portion, along the plurality of flow features, and through the outlet, and when the diverter member is in the second position, the plurality of flow features of the aerator member are not accessible such that the beverage flows through the body portion and flows through the outlet while bypassing the plurality of flow features of the aerator member.

2. The assembly of claim 1, wherein the body portion comprises a metal material that is configured to facilitate heat transfer from the heat transfer element to the beverage.

3. The assembly of claim 1, further comprising a grip operably coupled to the body portion, the grip including an outer surface and a plurality of channels extending vertically along a portion of the outer surface of the grip.

4. The assembly of claim 1, wherein the heat transfer element comprises a heat transfer material disposed in an interior of the body portion.

5. The assembly of claim 4, wherein the heat transfer material comprises a gel, and wherein the gel disposed within a pack.

6. The assembly claim 1, wherein the aerator member comprises a substantially vertical passage that includes a nose portion having a first end and a second end, the first end having a first diameter and the second end having a second diameter that is less than the first diameter.

7. The assembly of claim 1, further comprising a support member that includes a plurality of support apertures disposed circumferentially around a perimeter of the support member and a plurality of protrusions extending radially outward from a central axis of the support member.

8. The assembly of claim 7, wherein the support member is removably coupled to the diverter member.

9. A method of cooling a beverage, the method comprising:

providing the assembly of claim 1;

cooling the body portion of the assembly such that the heat transfer material reaches the control temperature;

providing the beverage to the assembly; and rotating the diverter member to the first position or the second position.

10. A method of filtering a beverage, the method comprising:

providing the assembly of claim 1;

placing a filter within the support member;

providing the beverage to the assembly; and rotating the diverter member to the first position or the second position.

11. An assembly for selectively aerating and heating or cooling a beverage having a first temperature, the assembly comprising:

a body portion configured to receive the beverage, the body portion including:

an upper portion having a plurality of surfaces protruding therefrom, and a lower portion coupled to the upper portion, the lower portion spaced from the upper portion and forming an interior void volume therebetween, and a heat transfer element having a control temperature, the heat transfer element comprising a heat transfer material disposed within the interior void volume such that the heat transfer element is adjacent the beverage to change a temperature of the beverage in the body portion from the first temperature to a second temperature different from the first temperature using the control temperature;

a support member removably coupled to the body portion;

a disposable filter carried by the support member, the disposable filter configured to remove impurities from the beverage as the beverage flows therethrough;

a diverter member in fluid communication with and operably coupled to the support member, the diverter member being rotatable between a first position and a second position;

an aerator member in fluid communication with the diverter member, the aerator member including a plurality of flow features in an aeration pattern, and an outlet;

wherein, when the diverter member is in the first position, the plurality of flow features of the aerator member are accessible such that the beverage flows through the body portion, along the plurality of flow features, and through the outlet, and when the diverter member is in the second position, the plurality of flow features of the aerator member are not accessible such that beverage flows through the body portion and flows through the outlet while bypassing the plurality of flow features of the aerator member.

12. The assembly of claim 11, wherein the support member includes a ledge extending substantially perpendicularly from the wall, the ledge configured to engage a perimeter of the diverter member.

13. The assembly of claim 11, wherein the diverter member being further positionable in a third position wherein the diverter member decouples from the body portion, thereby separating the body portion and the diverter member.

14. The assembly of claim 11, further including a grip coupled to the body portion, the grip including an outer surface and a plurality of channels extending vertically along a portion of the outer surface.

15. The assembly of claim 11, wherein the body portion comprises a metal material that is configured to facilitate heat transfer from the heat transfer element to the beverage.

16. A kit for selectively aerating and heating or cooling a beverage having a first temperature, the kit comprising:

an aeration device comprising:

a body portion configured to receive the beverage;

a heat transfer element having a control temperature, the heat transfer element carried by the body portion at a position adjacent the beverage, such that the heat transfer element is arranged to change a temperature of the beverage in the body portion from the first temperature to a second temperature that is different from the first temperature using the control temperature;

a diverter member in fluid communication with and operably coupled to the body portion, the diverter member being positionable between a first position and a second position; and an aerator member in fluid communication with the diverter member, the aerator member including a plurality of flow features in an aeration pattern, and an outlet;

wherein, when the diverter member is in the first position, the plurality of flow features of the aerator member are accessible such that the beverage flows through the body portion, along the plurality of flow features, and through the outlet, and when the diverter member is in the second position, the plurality of flow features of the aerator member are not accessible such that the beverage flows through the body portion and flows through the outlet while bypassing the plurality of flow features of the aerator member; and a container having an opening configured to receive the aeration device.

17. The kit of claim 16, wherein the aeration device further includes a grip coupled to the body portion, the grip including an outer surface and a plurality of channels extending vertically along a portion of the outer surface.

18. The kit of claim 16, wherein when the aeration device is received in the opening of the container, the plurality of channels provide fluid communication between the atmosphere and the container.

19. The kit of claim 16, wherein the body portion comprises a metal material that is configured to facilitate heat transfer from the heat transfer element to the beverage.

20. The kit of claim 16, wherein the heat transfer element comprises a heat transfer material disposed in an interior of the body portion.

* * * * *